US005783992A

United States Patent [19]

Eberwine et al.

[11] Patent Number: 5,783,992
[45] Date of Patent: Jul. 21, 1998

[54] TIME BASED LOW TIRE PRESSURE WARNING SENSOR

[75] Inventors: Todd D. Eberwine; Victor Mendez, both of Kokomo; Nguyen Phu Nguyen, Brownsburg, all of Ind.

[73] Assignee: Delco Electronics Corp., Kokomo, Ind.

[21] Appl. No.: 684,776

[22] Filed: Jul. 22, 1996

[51] Int. Cl.$^6$ ................................................. B60C 23/00
[52] U.S. Cl. ..................... 340/445; 340/825.69; 73/146.3
[58] Field of Search ........................... 340/445, 442, 340/444, 447, 539, 825.69, 438; 73/146.3, 146.5, 146.8; 200/61.22, 61.25

[56] References Cited

U.S. PATENT DOCUMENTS

| 4,163,208 | 7/1979 | Merz | 340/58 |
|---|---|---|---|
| 4,312,001 | 1/1982 | Marzolf | 73/146.5 |
| 4,316,176 | 2/1982 | Gee et al. | 73/146.5 |
| 4,363,020 | 12/1982 | Venema | 73/146.5 |
| 5,029,468 | 7/1991 | Dosjoub | 73/146.5 |
| 5,109,213 | 4/1992 | Williams | 340/447 |
| 5,115,236 | 5/1992 | Köhler | 340/825.69 |
| 5,285,189 | 2/1994 | Nowicki et al. | 340/447 |
| 5,289,369 | 2/1994 | Hirshberg | 364/401 |
| 5,463,374 | 10/1995 | Mendez, et al. | 340/442 |

FOREIGN PATENT DOCUMENTS

| 0 612 632 A3 | 2/1994 | European Pat. Off. | B60C 23/04 |
|---|---|---|---|

Primary Examiner—Jeffery Hofsass
Assistant Examiner—John Tweel, Jr.
Attorney, Agent, or Firm—Mark A. Navarre

[57] ABSTRACT

A battery powered sensor in a tire has a microprocessor and a transmitter circuit permanently connected to a battery and a pressure switch or pressure sensor coupled to the microprocessor. The microprocessor has a sleep state and wakes up every few minutes to execute an algorithm which determines on a time basis whether to read the pressure state and transmit a report of significant changes, and determines on a randomly timed basis whether to transmit a status report. A factory test state permits only one signal transmission when the tire is inflated and inhibits other signals for a period to allow testing of many tires without interference from one another.

7 Claims, 3 Drawing Sheets

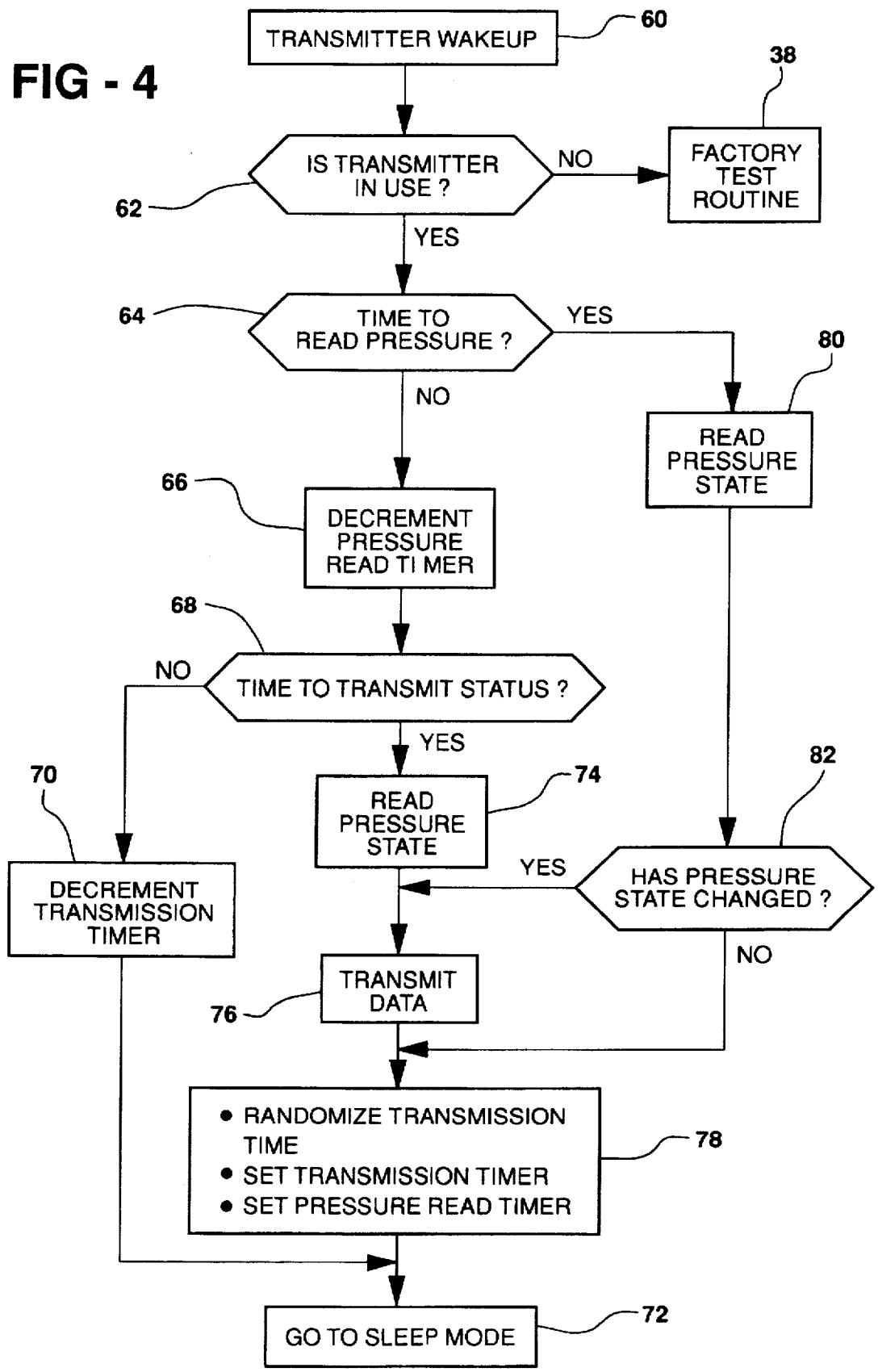

5,783,992

TIME BASED LOW TIRE PRESSURE WARNING SENSOR

FIELD OF THE INVENTION

This invention relates to a low tire pressure warning (LTPW) system and particularly to such a system for occasionally reporting transmitter status and warning of adverse pressure changes.

BACKGROUND OF THE INVENTION

It has previously been proposed to monitor tire pressure by a transducer within each vehicle tire. Several schemes have been tried for advising the vehicle operator of tire pressure conditions, especially in the case of low tire pressure. It is known, for example, to generate a visible signal at the tire and to visually inspect the signal. It is also known to generate a magnetic field at the transducer in response to a low pressure condition, to detect the field by a detector mounted near each wheel, and to display a warning on the instrument panel.

It has also been proposed to mount a transducer and radio transmitter within each tire and a receiver on the vehicle dedicated to processing transmitted tire pressure data and displaying necessary information. Since the apparatus contained within the tire must be wholly self-contained and is not easily accessed for service, the device battery must be long-lasting, perhaps lasting for the life of the vehicle. In addition, it is not sufficient to transmit a signal only in the case of abnormal pressure, rather a signal must be issued occasionally to assure the receiver that the transmitting unit is operational. Such signaling consumes power and offers a challenge to long battery life.

To economize on power consumption, it has been proposed in the U.S. Pat. No. 5,285,189 entitled "Abnormal Tire Condition Warning System" to include in the pressure warning apparatus an inertia (or acceleration) switch sensitive to wheel rotation wherein the battery is connected to the transmitter only when rotation is sensed or a pressure switch closes. That system also includes a microprocessor having a sleep mode to conserve power. Another proposal also uses an inertia switch to initiate a state of health message when a certain speed is attained. An adverse aspect of these approaches is that the addition of the inertia switch to the system adds cost and diminishes reliability.

It is therefore a challenge to achieve long battery life and increased reliability while reducing cost through elimination of the inertia switch in the LTPW system. If this is accomplished by simply allowing signal transmission irrespective of wheel rotation, then a factory which inflates tires and tests the warning system will be subject to a very large number of signals that will interfere with testing of the LTPW units.

SUMMARY OF THE INVENTION

It is therefore an object of the invention to achieve a LTPW transmitter unit which attains long battery life without an inertia switch. Another object in such a unit is to avoid repetitious signaling before factory installation.

A LTPW system has a vehicle mounted receiver and a transmitter or sender mounted in each tire for sending pressure data to the receiver which displays a warning when appropriate. The transmitter includes a pressure switch or absolute pressure sensor coupled to a microprocessor which in turn controls a RF transmitter circuit. A battery is continuously connected to the microprocessor and the transmitter circuit. The microprocessor generally resides in a low power consumption sleep mode and wakes up every few seconds to execute software stored therein.

The software is able to define a factory test state and an in-use state. Initially an IN-USE flag is clear to allow tire assembly, battery installation and factory testing. The program senses when the tire is first pressurized to a threshold level and then issues only a single signal for the test of the unit. After the tire is pressurized for a time sufficient for the transmitter to be removed from the factory test state, the IN-USE flag is set; thereafter the unit will be in the in-use state and will issue signals intermittently.

When the microprocessor wakes up and finds that the IN-USE flag is set, it determines from a read pressure timer whether it is time to read pressure; if so the pressure is read and the timer is reset. The timer value is several wakeup cycles so that the pressure is checked perhaps every 10 to 30 seconds. If the pressure switch has changed to low pressure or if a pressure sensor detects a significant pressure drop, the transmitter will be energized to send a warning signal to the receiver. When the pressure is not read, a transmission timer is checked for transmission time. When it is transmission time, pressure data is read and then transmitted. Then the transmission time is set at between 3 and 5 minutes by random selection, and the microprocessor enters sleep mode. Each timer is decremented each wakeup cycle until it times out or is reset. This rate of usage is expected to yield battery life of about ten years.

BRIEF DESCRIPTION OF THE DRAWINGS

The above and other advantages of the invention will become more apparent from the following description taken in conjunction with the accompanying drawings wherein like references refer to like parts and wherein:

FIGS. 3 and 4 are flow charts showing the operation of the transmitter portion of the system according to the invention.

DESCRIPTION OF THE INVENTION

Figure 1:
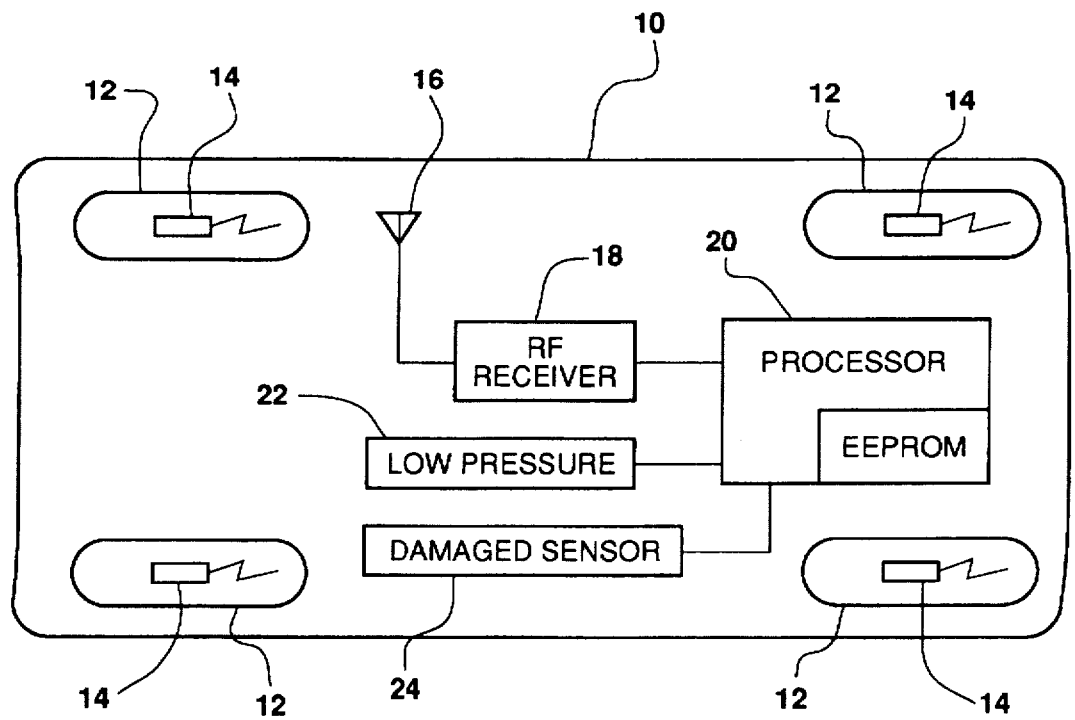
FIG. 1 is a schematic diagram of a low tire pressure warning system according to the invention.

Referring to FIG. 1, an automotive vehicle 10 has four tires 12, each equipped with a tire pressure sender (or transmitter) 14 residing within the tire and subject to tire pressure for transmitting radio signals carrying pressure related information. Each sender 14 has a unique identification code (ID) which is included in every transmission to verify the source of the signal. Transmitted signals are received by an antenna 16 coupled to a receiver 18. The receiver output data is fed to a processor 20 which is a microprocessor having a non-volatile memory such as an EEPROM for storage of tire ID and pressure data as well as a record of current transmitter activity. An algorithm within the microprocessor manages and evaluates the data and issues a low tire pressure signal to activate a telltale display 22 when a transmitted message indicates such a condition, and issues a damaged sender signal to activate a tell-tale display 24 when the pattern of received messages reveals less than four active senders.

Figure 2:
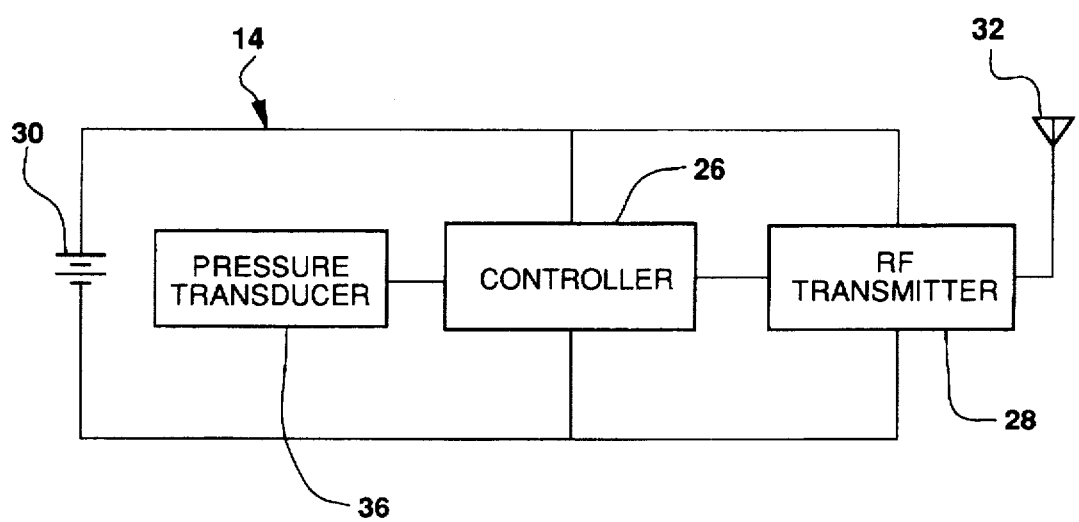
FIG. 2 is a schematic diagram of the tire pressure sender portion of the system of FIG. 1.

The tire pressure sender 14, as shown in FIG. 2, has a controller 26 and an RF transmitter 28, each powered by a battery 30, and a transmitter antenna 32. The controller comprises a microprocessor configured to maintain a sleep state requiring very low power consumption until it is awakened by an internal or external timer. The controller 26 has a data output coupled to the transmitter 28 for defining the transmitted signal. A pressure transducer 36 comprises a pressure switch or sensor which is an input to the controller 26.

The pressure transducer 36, if it is a switch, is set to change state (open or closed) at a suitable warning pressure. As the pressure in a tire drops below the set pressure the switch changes state and the controller detects the change of state to cause transmission of a message containing a low pressure code. When pressure is restored to the tire, the pressure switch reverts to its original state and the controller transmits a message with a pressure OK code. The processor 20 responds to the messages by suitably activating or deactivating the low pressure tell-tale 22. If the pressure transducer 36 is an absolute pressure sensor having an actual pressure output, the controller will sample the pressure to report the pressure or a significant pressure change.

Figure 3:
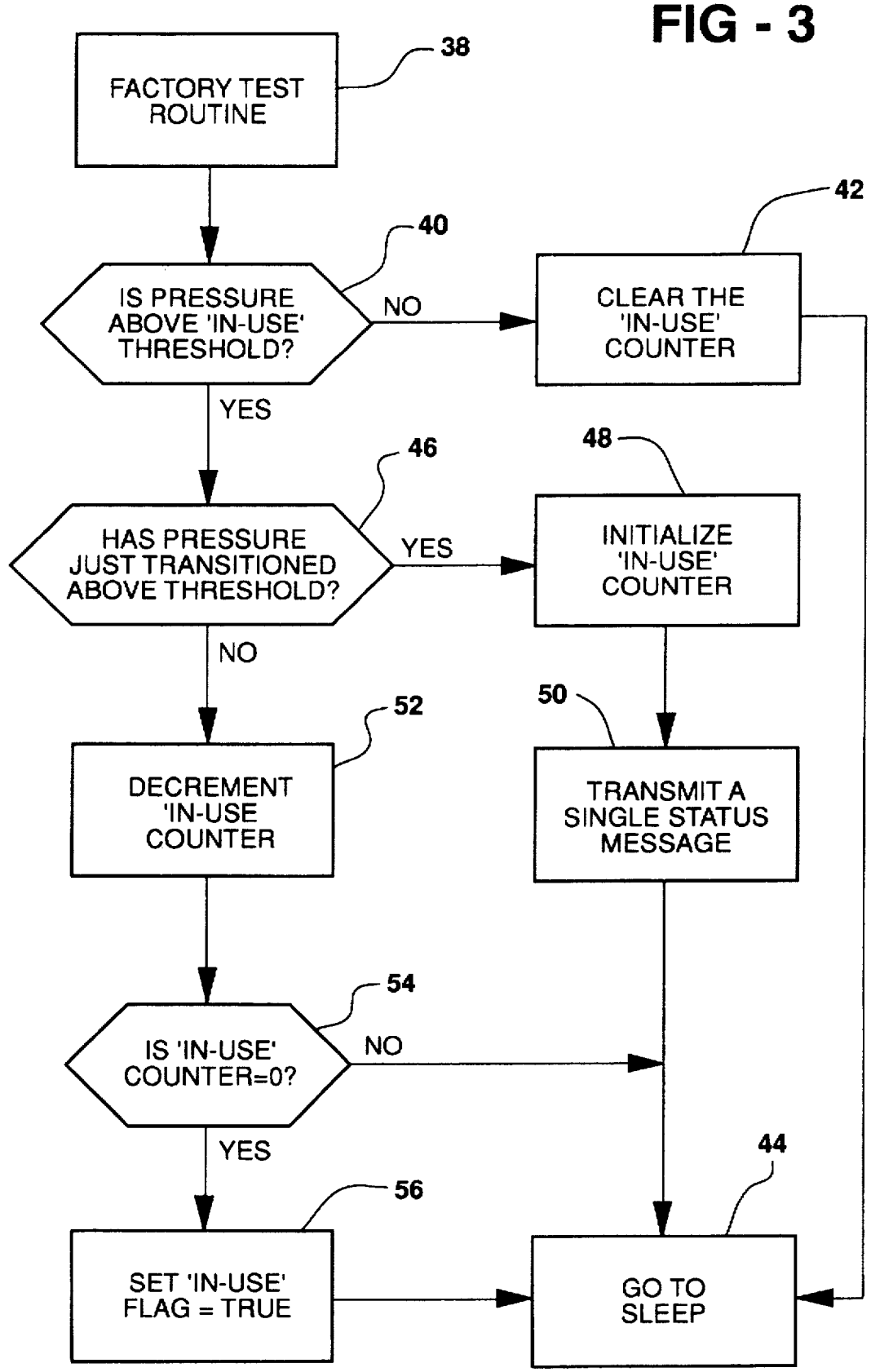

The controller 26 comprises a commercially available microprocessor which is programmed to operate in a factory test state and in an in-use state. The flow charts of FIGS. 3 and 4 represent the respective programs wherein the functional description of each block in the charts is accompanied by a number in angle brackets <nn> which corresponds to the reference number of the block. The factory test state is the initial condition of the controller when a battery is installed in the factory and an IN-USE flag has a default clear state. After tire assembly the units are tested when each tire is pressurize to verify pressure switch operation and signal transmission at the correct pressure. To prevent repetitive signaling from hundreds of tires in the factory, each transmitter is permitted only one signal during the factory test state. After a time delay, the IN-USE flag is set to terminate the factory test state and begin the in-use state.

The factory test program 38 is shown in FIG. 3. The program first checks the pressure to determine if it is above a set threshold <40>. If the pressure has not attained the threshold value an IN-USE counter is cleared <42> and the microprocessor returns to its sleep mode <44>. The microprocessor remains in the sleep mode for a set time, say, 3.5 seconds, and then wakes to again execute a wakeup cycle. If the pressure is above the threshold <40> and has just made the transition <46>, the IN-USE counter is initialized <48> to a value which defines the remaining life of the factory test state. The counter value should be large enough to assure time in the ordinary assembly process for the tire to leave the factory. When the counter is set, a single status message is transmitted <50> to complete the transmitter test. For cycles subsequent to issuing the status signal the IN-USE counter is decremented <52>. When the counter reaches 0 <54>, the IN-USE flag is set <56> to terminate the factory test state.

The general operating program is shown in FIG. 4. The microprocessor wakeup <60> occurs periodically. First the IN-USE flag is checked <62> to determine whether the transmitter is in service. If not the factory test routine is entered <38> but if the flag is set a pressure read timer is read to determine if it is time to read the pressure <64>. If not the pressure read timer is decremented <66> and a transmission timer is read <68> to see if it is time to transmit a pressure status report. If not, the transmission timer is decremented <70> and the microprocessor enters sleep mode <72>. If it is time to transmit a status report <68>, the pressure state (or value) of the transducer is read <74> and the appropriate data is transmitted <76>. In addition, a time within a range is randomly selected, the transmission timer is set to a count that corresponds to the selected time, and the pressure read timer is set to a predetermined count <78> before sleep mode is entered. If, in block 64, it is time to read the pressure, the pressure or pressure state is read <80>. If the pressure state has changed <82> that event is transmitted <76> and if not the program goes to block 78. Change of pressure state occurs if a pressure switch is operated or if a measure of absolute pressure has changed by a predetermined amount.

Keeping in mind that conservation of battery energy is important, the timer values are chosen to meet that goal as well as to supply current information on the tire pressure. The pressure read timer may be set to a count of about 5, for example, so that the pressure is checked every 20 seconds or so. Ordinarily a pressure check does not result in a signal transmission and thus uses minimal energy. The transmitter time may be selected from 3 to 5 minutes to provide frequent updates of the transmitter health.

The four pressure status transmissions on a vehicle are received by the receiver and processed independently. Each transmission will contain a status message which indicates the current state of the pressure switch (or reading of a pressure sensor) and will indicate to the receiver that all tire pressure monitors are working properly. If by chance two transmissions occur simultaneously, there is a danger that one signal would not be recorded. The clocks for operating the microprocessors are very close in frequency so that if two transmissions should coincide, they would remain in coincidence for a long time if they had the same transmitter time. The random selection of transmitter times prevents a continuation of coincident signals since the two transmitters will not likely be reset to the same time.

It will thus be seen that the LTPW system enables long battery life and frequent updates of tire pressure conditions without the use of an inertia switch or the like to limit the amount or frequency of data transmission.

The embodiments of the invention in which an exclusive property or privilege is claimed are defined as follows:

1. In a low tire pressure warning system having a transmitter and a pressure sensor wherein the transmitter has a sleep mode of low energy consumption, a wake mode of normal energy consumption and a transmission timer, a method of using the transmission timer for intermittently transmitting a pressure message comprising the steps of:

periodically entering the wake mode and determining whether the transmission timer indicates that it is time to transmit a pressure message;

when the transmission timer indicates that it is time to transmit a pressure message, transmitting a status report, selecting a random time within a prescribed time range, initializing the transmission timer with the selected random time, and returning to the sleep mode.

2. The invention as defined in claim 1 including the step of:

decrementing the transmission timer and returning to the sleep mode when, on entering the wake mode, the transmission timer indicates that it is not time to transmit a pressure message.

3. The invention as defined in claim 1 wherein the transmitter further includes a software pressure read timer, and the method includes the steps of:

during the wake mode determining whether it is time to read the pressure sensor;

if it is time to read the pressure sensor reading the pressure sensor state, initializing the pressure read timer, and if the pressure state has changed since the last reading, transmitting the pressure data; and returning to sleep mode.

4. The invention as defined in claim 1 including:

at the beginning of the wakeup mode determining if an IN-USE flag is set in the transmitter; and if the flag is not set, entering a factory test mode.

5. The invention as defined in claim 4 wherein the factory test mode comprises:

when pressure first transitions above a threshold, setting a counter representing a delay time, and transmitting a single status message;

decrementing the counter in subsequent wakeup cycles; and setting the IN-USE flag when the counter reaches a limit value;

whereby only a single status message is transmitted while in factory test mode and further transmissions are enabled after the delay time.

6. In a low tire pressure warning system having a factory test state for pressurizing a tire and an in-use state, the system including a transmitter and a pressure sensor wherein the transmitter has a sleep mode of low energy consumption and a wake mode of normal energy consumption, the method of intermittently transmitting a pressure message comprising the steps of:

periodically waking the transmitter from the sleep mode and checking an IN-USE flag;

if an IN-USE flag is not set, entering a factory test state and then setting the IN-USE flag a delay time after the tire is pressurized;

if the IN-USE flag is set, entering the in-use state and then transmitting a status report at selected times, and periodically monitoring the pressure sensor for changes and transmitting a warning when a significant pressure change is detected.

7. The invention as defined in claim 6 wherein transmitting a status report at selected times comprises the steps of:

determining via a transmission timer whether it is time to transmit a status report;

when it is not time to transmit, decrementing the transmission timer, and then returning to sleep mode; and when it is time to transmit reading the pressure state of the pressure sensor, randomly selecting a transmission time and resetting the transmission timer, transmitting a pressure message, and then returning to sleep mode.

\* \* \* \* \*